UNITED STATES PATENT OFFICE.

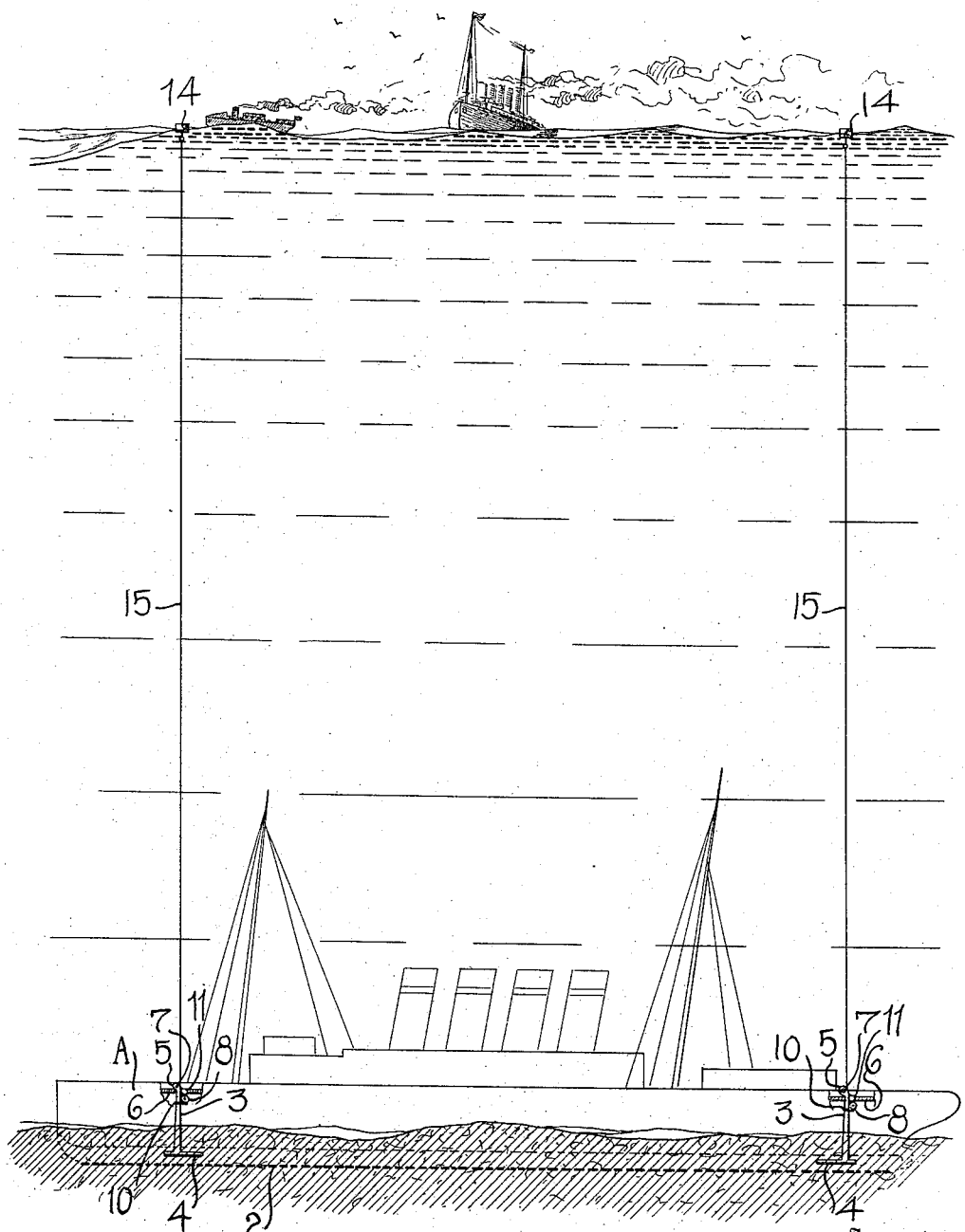

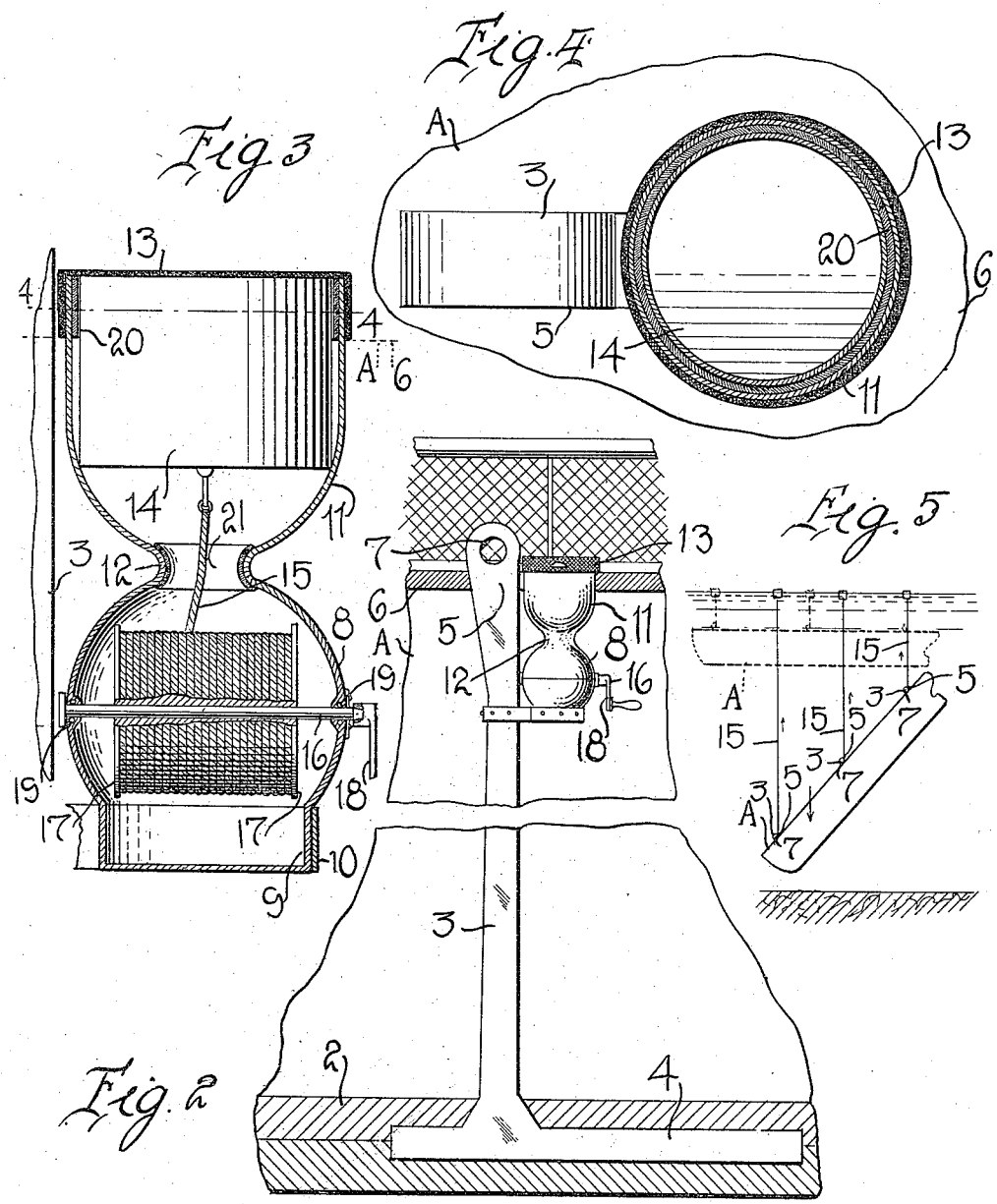

GEORGE E. BRACY, OF WATERTOWN, NEW YORK.

MEANS FOR LOCATING AND RAISING SUNKEN VESSELS.

1,176,196. Specification of Letters Patent. Patented Mar. 21, 1916.

Application filed June 9, 1915. Serial No. 33,184.

*To all whom it may concern:*

Be it known that I, GEORGE E. BRACY, a citizen of the United States, residing at Watertown, in the county of Jefferson and State of New York, have invented certain new and useful Improvements in Means for Locating and Raising Sunken Vessels, of which the following is a specification, reference being had to the accompanying drawings.

My invention relates to means for locating and raising sunken vessels, and particularly to that class of these devices wherein a float is used which remains upon the surface of the water after the vessel is sunk to indicate and locate the wreck.

The primary object of my invention is to provide a very simple and effective mechanism for this purpose so connected to the vessel that the position of the lifting columns or stanchions may be readily located.

A further object of my invention is to so construct these stanchions that great strain may be applied thereto without causing the vessel to part or break in lifting it.

Still another object of the invention is to provide a very simple means for holding and housing the cable or line connected to the float which will protect this cable or line from injury or from entanglement, and will at the same time permit the paying out of the line at the time of the submergence of the vessel without causing the float to be submerged.

Other objects will appear in the course of the following description.

My invention is illustrated in the accompanying drawings, wherein:

Figure 1 is a view showing my vessel locating means in use, the vessel being partly broken away; Fig. 2 is a vertical sectional view of a vessel showing my invention applied thereto: Fig. 3 is an enlarged vertical sectional view through the reel casing and the float casing; Fig. 4 is a section on the line 4—4 of Fig. 3; Fig. 5 is a view showing the action of the float in the case of a sinking vessel.

Referring to the drawings, A designates a vessel of any suitable character, and provided with the keel 2 as usual. Operatively connected to the keel and extending up therefrom at or near the bow and stern of the vessel, or in any other convenient position, are the vertically disposed columns or stanchions 3. Both of these stanchions are alike, and both are supplied with the indicating buoy hereafter described, and therefore the description of one stanchion will apply to the other.

The base of each stanchion or lifting column is relatively elongated, as at 4, and disposed within a recess in the keel preferably below the upper keel line. The base of these stanchions should be six or seven feet long. The stanchions at their upper ends are provided with relatively enlarged heads 5 which extend slightly above the deck 6 of the vessel and are formed at their upper ends with eyes 7.

Operatively supported upon each stanchion is a line casing or reel casing 8 which is shown as approximately globular in form, with a circular base portion 9 which is embraced and supported by means of a bracket and strip 10 firmly fastened to the stanchions in any suitable manner below the deck. Forming a part of the casing 8 and disposed above it is a float casing 11 which is approximately cylindrical in cross section but has a hemispherical lower end which joins the upper portion of the casing 8 and is connected therewith by a passage 12 of any suitable diameter. This passage 12 preferably has rounded walls. The upper end of the float casing 11 projects slightly above the deck line and is protected by a cover 13. This cover is preferably formed of water proof material, and has a relatively close fit upon the upper end of the float casing, and is intended for the purpose of preventing the buoy or float 14 rolling overboard in case of a storm. This cover has a fit just tight enough to prevent it from becoming accidentally displaced under ordinary conditions but can be readily lifted off at any time and may be provided with a handle for that purpose.

Disposed within the casing 11 is the float or buoy 14 previously referred to, which may be made of any suitable buoyant material but is preferably hollow and made of sheet metal. From the buoy or float extends a line or cable 15 which extends downward through the passage 12 and is adapted to be wound up upon a reel shaft 16. This shaft 16 extends through the casing 8 and is rotatably supported therein in any suitable manner and as shown carries upon it the oppositely disposed heads 17 for confining the line 15. The outer end of the reel shaft is provided with a crank 18 which is adapted to be detachable in order to prevent any tampering with the reel, and also in order that it may not be in the way. Preferably the reel shaft is mounted in ball bearings 19 carried upon the casing 8 and constructed in any suitable manner.

While I do not wish to limit myself to these details, yet preferably the inner face of that portion of the casing 11 which projects above the deck is lined with rubber 20 so as to prevent the introduction of water under ordinary circumstances to the casing 11, and preferably the passage 12 is also lined with rubber 21 to reduce friction of the line 15 against the wall of the passage.

The operation of my invention will be obvious. Under normal circumstances the casings 11 are closed by their covers 13. As these casings project only a small distance above the deck line they will not form obstructions of any moment. In time of storm the covers 13 may be removed, if desired. Under these circumstances, if the vessel sinks the floats or buoys 14 will remain upon the surface of the water and the line 15 will be unwound from the reel. When the vessel has reached bottom the buoys will remain upon the surface and locate the position of the vessel. and each buoy will indicate the location of its corresponding stanchion or lifting column so that grappling hooks or chains may be readily lowered and connected to the column.

It will alse be understood that the casings 11 and 8 are constructed of material sufficiently strong as to resist being crushed in by the pressure of water when the vessel sinks, and this resistance or crushing strain is further secured by the spherical shape of the casings. Inasmuch as the line is wound upon a reel there would be no chance of the line becoming entangled, and inasmuch as the reel is inclosed within its casing there will be no chance of the wreckage interfering with the paying out of the line.

While I have illustrated certain details of my construction, I wish it understood that these details may be changed in many ways without departing from the spirit of the invention.

Having described my invention, what I claim is:

In a vessel, a lifting column extending vertically through the vessel having an eye at its upper end projecting above the upper deck of the vessel, the column at its lower end being formed with an elongated base operatively connected to the keel, a reel and float casing mounted upon the column immediately below the upper deck of the vessel, the float casing opening above the deck, the casing being contracted at its middle to provide a lower reel chamber and an upper float chamber, a reel disposed in the reel chamber and including a shaft extending out of the reel chamber, said shaft at its end being adapted for engagement by a crank, a rope passing from the reel upward through said contracted portion of the chamber and connected to the float, and a readily detachable cover for the float casing located above the upper deck of the vessel.

In testimony whereof I hereunto affix my signature in the presence of two witnesses.

GEORGE E. BRACY.

Witnesses:
OTIS A. HUNT,
DENNIS L. WRIGHT.